US012781084B2

(12) United States Patent
Van Aert et al.

(10) Patent No.: US 12,781,084 B2
(45) Date of Patent: Nov. 3, 2026

(54) RESIN PARTICLE DISPERSION FOR INKJET PRINTING

(71) Applicant: Agfa NV, Mortsel (BE)

(72) Inventors: Hubertus Van Aert, Mortsel (BE); Bingyu Yang, Mortsel (BE); Johan Loccufier, Mortsel (BE); Ellen Bertels, Mortsel (BE); Jens Lenaerts, Mortsel (BE)

(73) Assignee: Agfa NV, Mortsel (BE)

( * ) Notice: Subject to any disclaimer, the term of this patent is extended or adjusted under 35 U.S.C. 154(b) by 231 days.

(21) Appl. No.: 18/714,157

(22) PCT Filed: Nov. 21, 2022

(86) PCT No.: PCT/EP2022/082560
§ 371 (c)(1),
(2) Date: May 29, 2024

(87) PCT Pub. No.: WO2023/099254
PCT Pub. Date: Jun. 8, 2023

(65) Prior Publication Data

US 2024/0392150 A1 Nov. 28, 2024

(30) Foreign Application Priority Data

Nov. 30, 2021 (EP) .................................... 21211274

(51) Int. Cl.
*C09D 11/54* (2014.01)
*B41J 2/01* (2006.01)
(Continued)

(52) U.S. Cl.
CPC ................. *C09D 11/54* (2013.01); *B41J 2/01* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 3,894,946 A 7/1975 Panzer et al.
5,912,306 A 6/1999 Pudney et al.
(Continued)

FOREIGN PATENT DOCUMENTS

CN 110191918 A 8/2019
EP 0829574 A1 3/1998
(Continued)

OTHER PUBLICATIONS

European Patent Office, International Search Report in International Patent Application No. PCT/EP2022/082560, mailed Feb. 28, 2023, 3 pp.

(Continued)

*Primary Examiner* — Manish S Shah
(74) *Attorney, Agent, or Firm* — Leydig, Voit & Mayer, Ltd.

(57) ABSTRACT

A liquid for inkjet printing comprising resin particles, the resin particles are obtainable by reaction between a polyamine crosslinker comprising at least two primary or secondary amines and a quaternary ammonium group and a compound comprising two functional groups capable of reacting with the primary or secondary amines of the crosslinker. The liquids for inkjet printing can be pre-treatment compositions, aqueous inkjet inks and overcoat varnishes.

19 Claims, 1 Drawing Sheet

Pattern used for inkjet printing to evaluate the image quality and physical properties of images obtained with pre-treatment compositions.

(51) Int. Cl.

| | |
|---|---|
| ***B41J 2/21*** | (2006.01) |
| ***B41M 5/00*** | (2006.01) |
| ***B41M 7/00*** | (2006.01) |
| ***C09D 11/102*** | (2014.01) |
| ***C09D 11/30*** | (2014.01) |
| ***C09D 11/322*** | (2014.01) |
| ***C09D 11/40*** | (2014.01) |
| ***C09D 175/04*** | (2006.01) |

(52) U.S. Cl.

CPC ........ *B41M 5/0017* (2013.01); *B41M 7/0018* (2013.01); *B41M 7/0036* (2013.01); *B41M 7/009* (2013.01); *C09D 11/102* (2013.01); *C09D 11/30* (2013.01); *C09D 11/322* (2013.01); *C09D 11/40* (2013.01); *C09D 175/04* (2013.01)

(58) Field of Classification Search

CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2004/0063808 | A1* | 4/2004 | Ma | C09D 11/30 523/160 |
| 2004/0106696 | A1* | 6/2004 | Ma | B41M 5/0017 523/160 |
| 2007/0076075 | A1* | 4/2007 | Schmid | C09D 11/30 347/102 |
| 2009/0226678 | A1 | 9/2009 | Yatake et al. | |
| 2012/0306976 | A1 | 12/2012 | Kitagawa et al. | |
| 2015/0239261 | A1* | 8/2015 | Sugiyama | C09D 11/38 347/21 |
| 2016/0115315 | A1 | 4/2016 | Ringold et al. | |
| 2019/0367760 | A1* | 12/2019 | Loccufier | B41M 5/0047 |
| 2019/0367761 | A1 | 12/2019 | Loccufier et al. | |

FOREIGN PATENT DOCUMENTS

| | | |
|---|---|---|
| WO | WO 2004/098767 A1 | 11/2004 |
| WO | WO 2014/039306 A1 | 3/2014 |
| WO | WO 2014/130204 A1 | 8/2014 |
| WO | WO 2018/138069 A1 | 8/2018 |

OTHER PUBLICATIONS

European Patent Office, Written Opinion in International Patent Application No. PCT/EP2022/082560, mailed Feb. 28, 2023, 4 pp.

* cited by examiner

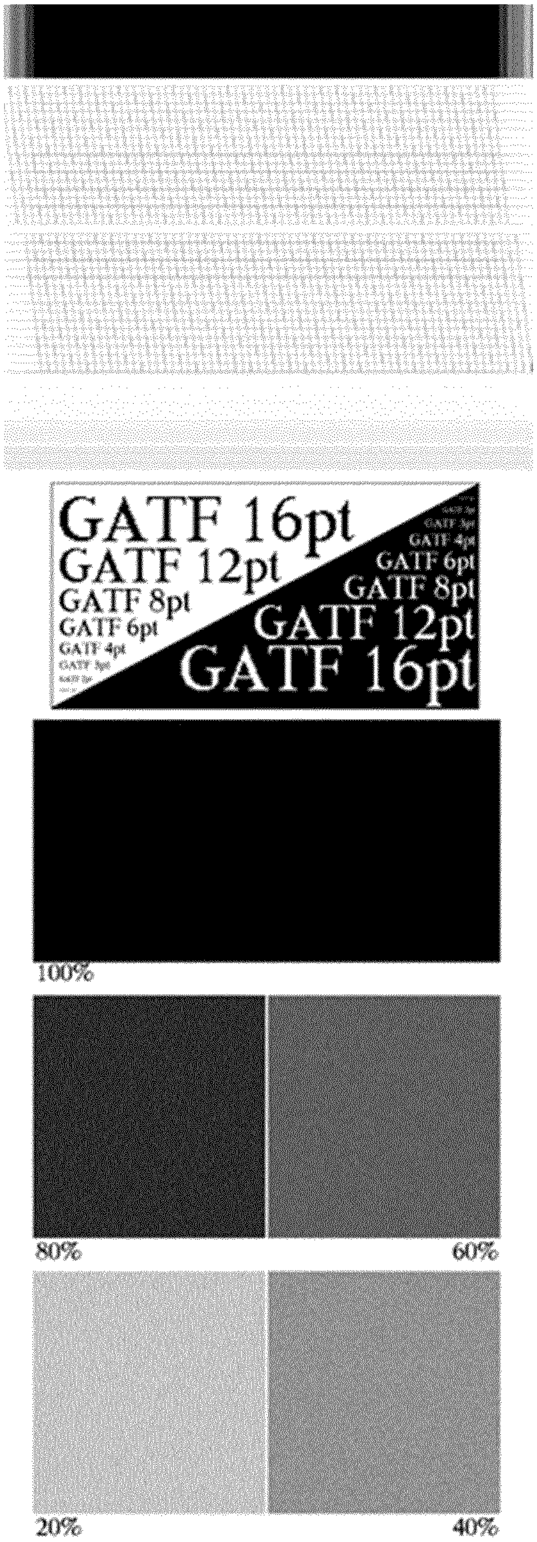
Pattern used for inkjet printing to evaluate the image quality and physical properties of images obtained with pre-treatment compositions.

RESIN PARTICLE DISPERSION FOR INKJET PRINTING

CROSS-REFERENCE TO RELATED APPLICATIONS

This patent application is the U.S. national stage of copending International Patent Application No. PCT/EP2022/082560, filed Nov. 21, 2022, which claims the benefit of European Patent Application No. 21211274.2, filed Nov. 30, 2021.

TECHNICAL FIELD

The invention relates to resin particle dispersions suitable for inkjet printing, more specifically for pre-treatment compositions for inkjet printing on porous and non-porous substrates and for overcoat varnishes to be applied on printed images.

BACKGROUND ART

Nowadays, there is a growing area of digital pre-printing of liners for corrugated packaging and corrugated card boards. The pre-printing of primers or pre-coats improves the image quality of the image which is printed upon the pre-coat. The possibility to apply a pre-coat, only of the parts which will carry the image, makes it possible to reduce consumption of the pre-coat composition. As the presence of pre-coat negatively influences the adhesion of glue, it is also beneficial to not apply pre-coat on the parts of the packaging material which has to be glued.

Inkjet printing is a growing area of printing of liners for corrugated packaging and of corrugated and folding card boards. In printing of liners for corrugated card boards, usually flexographic printing or offset printing is performed for applying a pre-coat or primer.

In order to obtain high quality images, the pre-coat is a composition capable of receiving ink and holding colorants in the ink to a greater degree than a substrate not treated with a pre-coat. In particular, the pre-coat is capable of holding colorants at or near the surface of a substrate so that optical density and colour gamut of the printed image may be improved compared to a porous substrate that is not treated with the pre-coat.

The colorant in aqueous inkjet inks for card board printing can be a dye or a pigment. Pigment based inks have the advantage of providing images with a higher light fastness than dye based inks. To bind the pigments to the substrate preferably reactive binder technology has been introduced into the inks but also into the pre-coats. Several approaches have been disclosed in the patent literature.

WO2014/039306A discloses a pre-treatment for digital printing on substrates comprising an aqueous cationic polyurethane dispersion, coagulating acids, and a reactive cross-linking moiety.

US2009/0226678 discloses an ink set comprising a fixing liquid for making pigments of inkjet inks fixed, comprising a polymer fine particle synthesized from an alkyl (meth) acrylate and/or cyclic alkyl (meth)acrylate, and a reactant being a block isocyanate, an oxazoline-containing polymer, or a polycarbodiimide.

WO2018/138069 discloses a pre-treatment liquid comprising capsules composed of a polymeric shell surrounding a core, the core comprising one or more chemical reactants capable of forming a reaction product upon application of heat and/or radiation and the shell is stabilized by cationic dispersing groups. The chemical reactants are preferably blocked isocyanates.

In inkjet printing on liners for corrugated packaging, folding boards and corrugated card boards, often an overcoat varnish may be applied and dried on top of the printed image and pre-treatment coating matrix. This type of coated layer system may provide increased water or moisture resistance and enhanced durability for inkjet printed images that can survive high temperatures and mechanical forces often present in corrugation packaging applications.

Preferably the overcoat varnishes are applied only on top of the printed images by means of a jetting technique, instead of covering the complete substrate.

The overcoat varnish often used in corrugated printing is aqueous based and comprises resins such as polystyrene polymers, polystyrene copolymers, polyacrylate polymers, polystyrene acrylate copolymers, polyurethane resin, or heat cross-linkable polymers.

These polymers have a tendency for film formation in the nozzles of the print head and in the ink supplies. Hence, if the overcoat varnish is applied by inkjet technology, the above described polymers will lead to reliability problems during printing. In industrial applications, system reliability and especially jetting reliability is of utmost importance. Moreover, the protecting ability of inkjet printed images by the dried resins is still to be improved.

The introduction of chemical reactants and reactive binders in aqueous liquids suitable for inkjet printing with pigment based, represent shelf-life stability problems due to the reactivity of the chemical reactants, health and safety issues, especially in contact with food and leads to bad spreading of aqueous inkjet inks onto the pre-treatment coating, leading to a reduced image quality. Furthermore, there is still a need for binder technology which guarantees reliable jetting behaviour of jettable liquids and which is deployable in different liquids for inkjet printing.

SUMMARY OF INVENTION

It is the objective of the present invention to provide a solution to the above stated problems. The objective has been achieved by providing a pre-treatment composition comprising resin particles as defined in claim 1.

It is another embodiment of the invention to provide an overcoat varnish for inkjet printing as defined in claim 8.

It is another embodiment of the invention to provide a fluid set containing an aqueous inkjet ink and a pre-treatment composition of claim 1 as defined in claim 9.

It is another embodiment of the invention to provide a printing method using a pre-treatment composition as defined in claim 11.

Other features, elements, steps, characteristics and advantages of the present invention will become more apparent from the following detailed description of preferred embodiments of the present invention. Specific embodiments of the invention are also defined in the dependent claims.

Preferred embodiments of the invention are also defined in the dependent claims. embodiments of the invention are also defined in the dependent claims.

BRIEF DESCRIPTION OF THE FIGURES

FIG. 1: Pattern used for inkjet printing during the evaluation of the image quality and physical properties of images obtained with pre-treatment compositions. The pattern contains solid areas and negative text with different size ranging from 1 pt to 16 pt.

DESCRIPTION OF EMBODIMENTS

A. Resin Particle Dispersion

A.1. Composition of the Resin Particles

The liquids for inkjet printing according to the invention comprise resin particles having a crosslinked polymeric shell carrying cationic charges.

A.1.1. Polyamine Crosslinker

The crosslinked polymeric shell of the resin particle in the liquids of the invention is obtainable by reacting a polyamine crosslinker comprising at least 2 primary or secondary amine groups and a group selected from the group of quaternary ammonium group and tertiary amine group with a compound comprising two functional groups capable of reacting with the crosslinker. Preferably the polyamine crosslinker comprising at least 2 primary or secondary amine groups and a quaternary ammonium group. The presence of the quaternary ammonium group assures a permanent cationic charge independent of the pH value of liquid wherein the resin particles of the invention are incorporated.

Preferably, the functional groups are selected from the group consisting of an epoxide, an isocyanate, a β-keto-ester, a β-keto-amide, an anhydride, a 1,3-diketone, a chloroformate, a sulfochloride, an acid halide, an enol ester, an oxalate ester and an aziridine. The reaction is preferably taking place at an interface which is formed by an oleophilic phase and an aqueous phase. In that case the reaction is an interfacial polymerisation reaction.

A preferred polyamine crosslinker is according to General Formula I and II.

General Formula I

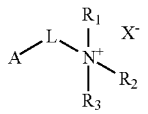

General Formula II

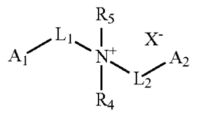

Wherein

- $R_1$, $R_2$, $R_3$, $R_4$ and $R_5$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group
- L, $L_1$ and $L_2$ represent independently a divalent linking group having no more than 15 carbon atoms
- A represents a structural moiety comprising at least two functional groups selected from the group consisting of a primary and a secondary amine
- $A_1$ and $A_2$ independently represent a structural moiety comprising at least one functional group selected from the group consisting of a primary and a secondary amine
- $X^-$ is a counter ion to compensate the positive charge of the quaternary ammonium group.

More preferably, the linking groups L, $L_1$ and $L_2$ is according to Formula III, IV or V:

Formula III

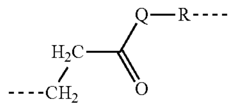

Wherein Q is O or NH and R is an alkyl or substituted alkyl group.

Formula IV

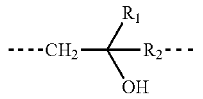

Wherein $R_1$=H, substituted or unsubstituted alkyl and $R_2$=substituted or unsubstituted alkyl $$-CH_2-R_1- \quad \text{Formula V}$$

Wherein $R_1$ is substituted or unsubstituted alkyl

The dashed lines in Formula III, IV and V represent the bondings of the linking group in the structures of Formula I and II.

The oleophilic phase is preferably obtained by dissolving the compound comprising two functional groups capable of reacting with the crosslinker in a solvent having a limited miscibility with water, e.g. ethyl acetate which is then emulsified as small drops in an aqueous phase. The functional groups being an epoxide, an isocyanate, a β-keto-ester, a β-keto-amide, an anhydride, a 1,3-diketone, a chloroformate, a sulfochloride, an acid halide, an enol ester, an oxalate ester or an aziridine.

The polyamine comprising at least two primary or secondary amines and a quaternary ammonium group is preferably added in the aqueous phase.

Preferably, the polyamine, when added to the oleophilic phase should contain only secondary amine groups. It has been observed that particle sizes of the resin particles higher than 1 μm are then avoided. The polyamine can also be added into the oleophilic phase. Particle sizes higher than 1 μm are not compatible with the jettability requirement of the liquids comprising the aqueous resin dispersion of the invention.

After or during the emulsifying of the oleophilic phase in the aqueous phase, the polyamine comprising at least two primary or secondary amines and a quaternary ammonium group, may react at the interface between the oleophilic and the aqueous phase with the compound containing at least two functional groups capable of reacting with the primary or secondary amines of the crosslinker. Preferably the functional groups are an epoxide, an isocyanate, a β-keto-ester, a β-keto-amide, an anhydride, a 1,3-diketone, a chloroformate, a sulfochloride, an acid halide, an enol ester, an oxalate ester or an aziridine. In most cases a crosslinked polymeric shell is obtained partially or fully surrounding the dispersed phase. The resin particles of the invention comprise also particles which do not have a separate dispersed phase but having a polymeric shell showing a gradient in crosslinking degree which is higher at the surface than inside the particle.

The polyamine comprising at least two primary or secondary amines and a quaternary ammonium group is preferably a cationic polyamine. The effect of using a cationic polyamine comprising at least two primary or secondary amines and a quaternary ammonium group via the aqueous phase is the formation of a crosslinked polymeric shell bearing cationic charges at the surface of the shell. As most cationic charges are concentrated at the surface, the colloidal stabilizing effect is maximized, with respect to resin particles consisting of cationic polymers bearing cationic charges throughout the whole particle cross section. Preferably the functional groups of the compound are an epoxide, an isocyanate, a β-keto-ester, a β-keto-amide, an anhydride, a 1,3-diketone, a chloroformate, a sulfochloride, an acid halide, an enol ester, an oxalate ester or an aziridine.

In a preferred embodiment compounds which show a certain hydrophilic character and which do not react with the polyamine comprising at least two primary or secondary amines and a quaternary ammonium group, can be added in the oleophilic phase prior to the particle formation step. Without being bound by a theory, it is thought that these compounds increase the swelling of the resin particle by aqueous inks, leading to an improved ink spreading onto the pre-coat containing the resin particles.

These compounds can be hydrophilic solvents, oligomers or polymers.

Preferably, the oligomers or polymers can be selected from the group consisting of poly(urethanes) and copolymers thereof, acrylics and copolymers thereof, poly(esters), poly(styrenes) and copolymers thereof, poly(vinyl amides) and copolymers thereof, poly(vinyl alcohol) derivatives and copolymers thereof, poly(acetals) and copolymers thereof, poly(ethers) and copolymers thereof, poly(vinyl ethers) and copolymers thereof, polyvinyl(esters) and copolymers thereof, poly(imides) and copolymers thereof, poly(imines) and copolymers thereof, polycarbonates and copolymers thereof, poly(vinyl chloride) and copolymers thereof, poly (vinylidene chloride) and copolymers thereof poly(amic acids) and copolymers thereof, poly(saccharides) and derivatives thereof and cellulose and derivatives thereof.

By altering the ratio of these non-reactive polymers over the compound containing at least two functional groups capable of reacting with the primary or secondary amines of the polyamine crosslinker, and by using different amounts of the polyamine in the aqueous phase, the thickness of the shell can be modified.

In a more preferred embodiment, the oleophilic phase comprises a polyisocyanate and the aqueous phase comprises a cationic polyamine comprising at least two primary or secondary amines and a quaternary ammonium group. Upon reaction between these two compounds, a urea bond is formed.

In interfacial polymerisation reactions, polyamine crosslinkers such as oligo ethylene imine structures (e.g. TETA=triethylene tetramine, DETA=diethylene triamine or tetraethylenepentamine) are often used. The disadvantage of such polyamines is that the reaction speed is very high with a polyisocyanate due to the presence of the primary amines. If such a polyamine is added during the emulsifying step, the crosslinking reaction already starts before small drops of the oleophilic phase are obtained and consequently a high particle size of the resin particles is reached. This too high particle size is not compatible with the jetting requirements of an ink jettable liquid.

The particle size of the drops of the oleophilic phase can be decreased by adding large amounts a surfactant but this can deteriorate the final physical properties of the printed image.

Reacting a polyamine having primary and secondary amine groups with a reagent having cationic groups, the primary amine groups will firstly react in most cases except in alkylation reactions where the secondary amine groups react faster. In any case, the formed polyamine crosslinker will have consequently a lower reactivity towards the compound containing at least two functional groups capable of reacting with the primary and secondary amines of the crosslinker in an interfacial reaction. This enables to add the polyamine crosslinker during the dispersion step and not get too fast reaction. Since the cationic crosslinker also offers electrostatic stabilisation to the obtained resin particle, no huge amounts of surfactant are required to stabilize the particles during the preparation step. This reduces foam formation during the preparation of the particles. On top of that, also non-reactive cationic surfactants may be used. An advantage is that such non-reactive surfactants are more readily commercially available and are often also food compliant or Swiss list compliant.

Polyamine crosslinking agents comprising at least two primary or secondary amines and a quaternary ammonium group are not readily available. Typical polyamines to be used in the preparation of the polyamine crosslinker comprising at least two primary or secondary amines and a quaternary ammonium group are listed in Table 1:

TABLE 1

Polyamines which may be used as reagents for preparing polyamine crosslinking agents.

| Name | CAS-nr. | Nr. |
|---|---|---|
| Triethylenetetramine (TETA) | 112-24-3 | PA-1 |
| Diethyenetriamine | 111-40-0 | PA-2 |
| N4-Amine N,N'-Bis-(3-Aminopropyl)-ethylenediamine | 10563-26-5 | PA-3 |
| $H_2N—(C_2H_4—NH)_n—H$, with n = 4-13 | 68131-73-7 | PA-4 |
| Polyazeridine | 9002-98-6 | PA-5 |
| Diethylenetriamine-dicyandiamide copolymer | 50862-68-5 | PA-6 |

The above mentioned polyamines can be reacted with a cationic epoxy compound, such as glycidyltrimethylammonium chloride, ie. CAS nr. 3033-77-0 (e.g. GMAC supplied by Sachem). Other suitable epoxy compounds are glycidyldimethyldodecylammonium chloride, glycidyltriethylammonium chloride, glycidyldimethyloctylammonium chloride, N,N-dimethyl-N-(phenylmethyl)-oxiranemethanaminium chloride, (2,3-Epoxypropyl)tris(2-hydroxyethyl) ammonium chloride, N,N-dimethyl-N-(oxiranylmethyl)-oxiranemethanaminium, chloride, α,α'-[[octadecyl (oxiranylmethyl)iminio]di-2,1-ethanediyl]bis[ω-hydroxy-poly(oxy-1,2-ethanediyl), chloride, N,N,N-trimethyl-oxiranepropanaminium bromide, N-ethyl-N,N-bis(2-hydroxyethyl)-oxiranemethanaminium chloride.

Reaction e.g. of TETA with one equivalent of GMAC, will lead to a mixture of products. The primary amine groups will react faster than the secondary amine groups. Preferably the GMAC is slowly added to the TETA, in order to get more mono-functionalised polyamine (e.g. Formula V) than bis (GMAC) adduct (e.g. Formula VI). Reaction of PA-1 with GMAC leads to the product according to Formula VI and VII.

Formula VI

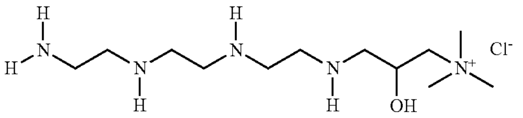

And

Formula VII

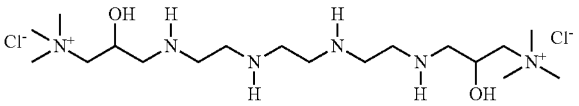

After modification of the polyamine the polyamine should still have unreacted NH or $NH_2$ groups, in order to be reactive towards the compound containing at least two functional groups such as an epoxide, an isocyanate, a β-keto-ester, a β-keto-amide, an anhydride, a 1,3-diketone, a chloroformate, a sulfochloride, an acid halide, an enol ester, an oxalate ester or an aziridine.

As an alternative to the reaction with GMAC is the reaction with 3-chloro-2-hydroxypropyltrimethyl ammonium chloride (e.g. using Reagens 65 supplied by Sachem), CAS nr. 3327-22-8.

As compared to the reaction with GMAC, a similar reaction product is formed, but additional 1 equivalent of HCl is present which will protonate the one of the other amine groups of the polyamine. Another difference is that the alkylation using a halide like Reagens 65 will be more reactive on secondary amine groups than on primary amine groups.

A reaction of TETA with Reagens 65 gives the product according to Formula VIII:

Formula VIII

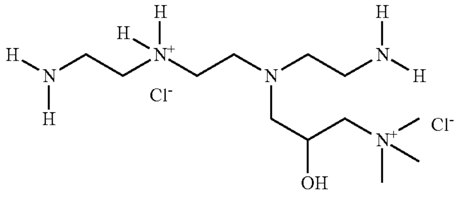

Besides the use of an epoxy-amine reaction for modification of the polyamine, one can also use a Michael addition reaction. Reacting TETA with a cationic acrylate (Q=O) or acrylamide (Q=NH) leads to products according to Formula IX:

Formula IX

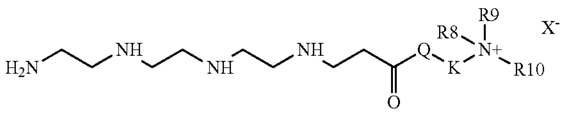

Wherein

Q represents an O or NH

R8, R9 and R10 is a substituted or non-substituted alkyl, aryl, alkyl aryl group K is a linking group.

Examples of cationic acrylamides or acrylates which can be used are listed in Table 2.

TABLE 2

Cationic acrylamides/acrylates

| Name | Cas nr. | Nr. |
|---|---|---|
| Acryloyloxyethyltrimethylammonium chloride | 44992-01-0 | AC-1 |
| Acryloyloxyethyldimethylbenzylammonium chloride | 46830-22-2 | AC-2 |
| Acrylamidopropyl)trimethylammonium chloride | 45021-77-0 | AC-3 |
| N,N,N-trimethyl-1-[(1-oxo-2-propen-1-yl)amino]-methanammonium chloride (1:1) | 48052-66-0 | AC-4 |
| N,N,N,3-tetramethyl-3-[(1-oxo-2-propen-1-yl)amino]1-butanaminium-, chloride (1:1), | 43078-35-9 | AC-5 |
| 2-Acryloyloxyethylphosphorylcholine | 150120-15-3 | AC-6 |
| Sulfopropyl dimethylammonium propyl acrylamide | 80293-60-3 | AC-7 |
| N-(2-carboxyethyl)-N,N-dimethyl-3-[(1-oxo-2-propenyl)amino]-1-propanaminium, inner salt | 79704-35-1 | AC-8 |
| N-(2-Acryloyloxyethyl)-N,N-dimethyl-N-(sulfopropyl)betain | 88992-91-0 | AC-9 |
| 3-(Acryloyloxy)-2-hydroxypropyltrimethylammonium chloride | 13052-13-6 | AC-10 |
| ,N,N,2,2-pentamethyl-3-[(1-oxo-2-propenyl)oxy]-1-propanaminium, chloride | 84100-29-8 | AC-11 |

The cationic charge density of the polyamine crosslinker can be increased by modifying the polyamine with more than 1 equivalent of cationic reagent. Another way of increasing charge density is by decreasing the pH before, during or after the resin particle dispersion preparation in order to form more quaternary amines due to protonation.

Instead of reacting a cationic reagent with the polyamine, one can react also reagents having a tertiary amine group such as listed in Table 3.

TABLE 3

Acrylates and acrylamides containing a tertiary amine group

| Name | CAS nr. | Nr. |
|---|---|---|
| N-[3-(Dimethylamino)propyl]acrylamide, | 3845-76-9 | TA-1 |
| Dimethylaminoethyl acrylate | 2439-35-2 | TA-2 |
| N-[2-(Dimethylamino)ethyl]acrylamide | 925-76-8 | TA-3 |

Products like dimethylamino propyl acrylamide can also be quaternized with reagents like 3-Chloro-2-hydroxypropyltrimethyl ammonium chloride, in order to obtain products with a higher charge density: 2-hydroxy-N,N,N,N',N'-pentamethyl-N'-[3-[(1-oxo-2-propenyl)amino]propyl]-1,3-propanediaminium, dichloride (CAS nr. 110226-36-3).

Besides cationic reagents also amphoteric reagents can be reacted with a polyamine, e.g. N-(2-carboxyethyl)-N, N-dimethyl-3-[(1-oxo-2-propenyl)amino]-1-propanaminium, inner salt (CAS nr. 79704-35-1).

An another reaction type which can be used to make a polyamine comprising at least two primary or secondary amines and a quaternary ammonium group, is the reaction of an aldehyde with the polyamine forming an imine, e.g. using 2-(dimethylamino) acetaldehyde (CAS nr. 52334-92-6), or derivatives of 2-(dimethylamino) acetaldehyde, e.g. the reaction product with Reagens 65.

The cationic polyamine crosslinkers could be derived from protonated tertiary amines. Polyamines with secondary and primary amines can also become cationic at low pH, but are less preferred if the pH of the jettable liquids have a pH of 5 or higher. These can be obtained by modification of regular polyamines, such as: Spermidine, Diethylenetriamine, N,N'-Bis(2-aminoethyl)-1,3-propanediamine, Triethylenetetramine, Tetraethylenepentamine, N,N'-Bis(3-amino-propyl)ethylenediamine, Pentaethylenehexamine, Bis(hexamethylene)triamine, Bis(3-aminopropyl)amine, Bis(3-aminopropyl)methylamine, Bis(2-aminoethyl)methylamine, Tris(2-aminoethyl)amine, Tris(3-aminopropyl)amine For modifying the above mentioned polyamines one can use e.g. an Michael addition reaction using the following reagents, e.g.: N-[3-(Dimethylamino) propyl]acrylamide, Dimethylaminoethyl acrylate, N-[2-(Dimethylamino)ethyl] acrylamide, 3-(Dimethylamino) propyl acrylate.

The above mentioned polyamines can also be modified by means of an epoxy amine reaction using the following reagents, e.g.: N, N-Dimethyl-2-oxiranemethanamine and N, N-dimethyl-2-Oxiranepropanamine.

A.1.2. Compound Having at Least 2 Functional Groups Capable of Reacting with the Primary and Secondary Amines of the Crosslinker The dispersion comprising the resin particles as used in the liquids according to the invention is obtainable by reacting a polyamine crosslinker comprising at least two primary or secondary amines and a quaternary ammonium group, with a compound containing at least two functional groups capable of reacting with the primary and secondary amines of the crosslinker. Preferably the functional groups are an epoxide, an isocyanate, a β-keto-ester, a β-keto-amide, an anhydride, a 1,3-diketone, a chloroformate, a sulfochloride, an acid halide, an enol ester, an oxalate ester or an aziridine. Other preferred functional groups are acid halides, chloroformates, enol esters, oxalate esters, N-hydroxysuccinimide active esters, t-butyl carbamates/carbonates, and other active esters. Examples of active ester chemistry is described in Major Methods of Peptide Bond Formation, Chapter 3-Active Esters in Peptide Synthesis, The Peptides: Analysis, Synthesis, Biology, 1979, Pages 105-196 by Miklos Bodanszky.

Some examples of useful reagents are: Adipoyl chloride (CAS number 111-50-2), Phthaloyl chloride (CAS number 88-95-9), Diphenoyl dichloride (CAS number 7535-15-1), 3,3'-[[2,2-Bis[(3-chloro-3-oxopropoxy)methyl]-1,3-propanediyl]bis(oxy)]bis[propanoyl chloride](CAS number 132491-88-4), 3,3'-[[2-[(3-chloro-3-oxopropoxy)methyl]-2-ethyl-1,3-propanediyl]bis(oxy)]bis-propanoyl chloride (CAS nr.78799-44-7), 2,4,6-trioxo-1,3,5-triazine-1,3,5 (2H, 4H,6H)-tripropanoyl chloride (CAS nr.33919-40-3), Tricyclo[3.3.1.13,7]decane-1,3,5-tricarbonyl trichloride (CAS nr.753025-22-8), Oxydiethylene bis(chloroformate) (CAS nr. 106-75-2), 1,4-Butylene glycol bis(chloroformate) (CAS nr.2157-16-6), Trimethylolpropane tris(chloroformate) (CAS nr. 14031-47-1). Polymeric curing agents having active ester groups are also commercially available e.g. from Dai Nippon Ink & Chemicals, eg. Epiclon EXB 9451 (Cas nr. 931106-68-2) and Epiclon HPC 8000-65T (CAS nr. 1352138-02-3). Active ester based initiators to prepare (co) polymers having an active ester group capable of reacting with the polyamine curing agent, e.g. as the structure described in patent JP2001206946. Copolymer of an active ester functional monomer such as: NHS-PEO8-maleimide (CAS nr.289888-73-9). Condensation copolymers of Diglycolic acid chloride (CAS nr.21062-20-4). Copolymers of sulfonyl chloride monomers such as: 2-propenesulfonyl chloride and p-styrenesulfonyl chloride.

Different chemistries can be used as suitable polyisocyanates. Preferably, the polyamine comprising at least two primary or secondary amines and a quaternary ammonium group, is reacted with an organic solvent soluble isocyanato based resin, such as a polyisocyanate (e.g. biuret, allophanate or isocyanurate trimer based structures). For obtaining a good reactivity and crosslink density, biuret functional polyisocyanates such as Desmodur N3200 or Desmodur N75 BA are preferred.

The chemistry of the polyisocyanate has a significant effect on the particle formation during the high shear treatment and interfacial polymerization. The type of polyisocyanate used influences e.g. reactivity towards the polyamine, the solubility in the organic solvent and the viscosity. Suitable polyisocyanates are monomeric isocyanates, biuret structures, urethione, allophanate, isocyanurate trimer, isocyanate adducts or (partially) modified polyisocyanates.

Examples of modified polyisocyanates are hydrophilic isocyanates such as polyether modified polyisocyanates, e.g Bayhydur 3100, Bayhydur 305, Bayhydur XP2451/1. The type of isocyanate present in the polyisocyanate is also important for the adhesion properties of the pre-treatment composition to the substrate and the physical properties of the overcoat varnish. Hexamethylene diisocyanate (HDI) offers a higher flexibility than isophorone diisocyanate (IPDI) isocyanates.

Optimized properties can be obtained using polyisocyanates based on mixtures of monomeric isocyanates, such as mixtures of HDI and IPDI. The polyisocyanates can be based on the following monomeric isocyanates: isophorone diisocyanate (IPDI), 4,4'-dicyclohexylmethane diisocyanate (H12MDI), 2,4,4'-trimethyl-1,6-hexamethylene diisocyanate (TMDI), hexamethylene diisocyanate (HMDI), pentamethylene diisocyanate (PDI), tolylene diisocyanate (TDI), xylene diisocyanate (XDI) and diphenylmethane diisocyanate (MDI). Modified polyisocyanates can also be used. Examples are reaction products with alcohols, such as TMP (=trimethylol propane) or alcohol terminated polymers.

Other suitable isocyanate containing compounds are isocyanato monomer based copolymers prepared by radical copolymerization. The copolymerization can be performed in the organic solvent which is used to make the oleophilic phase. Suitable monomers to make an isocyanato functional copolymer via addition polymerization are e.g. isocyanatoethylmethacrylate, 2-isocyanatoethyl acrylate, 3-isocyanatopropyl 2-propenoate and 1-(1-Isocyanato-1-methylethyl)-3-isopropenylbenzene (TMI monomer Allnex). A copolymer of methylmethacrylate and 1-(1-Isocyanato-1-methylethyl)-3-isopropenylbenzene can be obtained in ethyl acetate and consequently can be used in the preparation of the resin particle dispersion of the invention.

In another preferred embodiment, the compound reacting with the polyamine comprising at least two primary or secondary amines and a quaternary ammonium group, are epoxy containing resins. Examples are bisphenol A diglycidyl ether based epoxy resins, copolymers of epoxy functional monomers such as glycidyl methacrylate (GMA), glycidyl acrylate, allyl glycidyl ether, 4-vinylcyclohexene oxide or (3,4-epoxycyclohexyl)methyl acrylate and epoxydised oils, such as epoxidized soybean oil.

In another embodiment of the invention, the compound reacting with the polyamine comprising at least two primary or secondary amines and a quaternary ammonium group, are polyazeridines. Suitable polyazeridines are NeoAdd Pax 521 (ie. a 80% solution in ethyl acetate) supplied by Covestro and polyazeridines as described in the patent application WO 2020/020714 by DSM IP Assets B.V.

In another embodiment of the invention, the compound reacting with the polyamine comprising at least two primary or secondary amines and a quaternary ammonium group, are alkoxy silane functional polymers such as SiliXan Lab 1039

M1 supplied by SiliXan GmbH (50% in butyl acetate) and copolymers of siliane monomers. Suitable silane monomers are 3-(Trimethoxysilyl) propyl methacrylate, supplied under the trade name Dynasilan MEMO (Evonik), Geniosil GF31 (Momentive), KBM-503 (Shin Etsu Silicones), vinyl trimethoxy silane, Geniosil XL10 (Momentive), acryloxypropyltrimethoxysilane, methacryloxypropyltriethoxysilane, 3-acryloxypropyltriethoxysilane, methacryloxypropyltriisopropoxysilane, ethacryloxymethyl)trimethoxysilane, methacryloyloxymethyltriethoxysilane, 3-[tris(2-methoxyethoxy) silyl]propyl 2-methyl-2-propenoate, 4-oxo-4-[[3-(triethoxysilyl) propyl]amino]-2-butenoic acid, 2-methyl-N-[3-(triethoxysilyl) propyl]-2-propenamide, N-[3-(Trimethoxysilyl) propyl]-2-propenamide, (3-acryloxypropyl)methyldimethoxysilane, 3-(Diethoxymethylsilyl) propyl 2-propenoate, (dimethoxymethylsilyl)methyl ester, vinyltriethoxysilane, Vinylmethyldimethoxysilane, vinyltriisopropoxysilane, vinylmethyldiethoxysilane, 1,3-Diethenyl-1,1,3,3-tetraethoxydisiloxane, (ethenyldiethoxysilyl)benzene, 3-(trimethoxysilyl)-2-propen-1-yl 2-methyl-2-propenoate, 1,3-diethenyl-1,1,3,3-tetramethoxydisiloxane, 1-Ethenyl-4-(trimethoxysilyl)benzene, 1-Ethenyl-4-(triethoxysilyl)benzene, 1-(diethoxymethylsilyl)-4-ethenylbenzene, Acryloxy-2-hydroxypropyl)-3-aminopropyltriethoxysilane, 1-[3-(triethoxysilyl) propyl]-1H-pyrrole-2,5-dione, (2Z)-4-oxo-4-[[3-(triethoxysilyl) propyl]amino]-2-butenoic acid, N-2-propen-1-yl-N-[3-(triethoxysilyl) propyl]-2-propen-1-amine, 4-oxo-4-[[3-(triethoxysilyl) propyl]amino]-2-butenoic acid, 2-propenoic acid, 4-[[3-(trimethoxysilyl) propyl]amino]butyl ester, 2-propenoic acid 9,9-diethoxy-4-oxo-3,10-dioxa-5-aza-9-siladodec-1-yl ester (2Z)-4-[[3-(diethoxymethylsilyl) propyl] amino]-4-oxo-2-butenoic acid.

In another embodiment of the invention, the compound reacting with the polyamine comprising at least two primary or secondary amines and a quaternary ammonium group, can be resins having acrylate or acrylamide groups and which are able to react via a Michael addition. Such resins can be prepared by modification of hydroxyfunctional polymers using isocyanato ethyl acrylate or by modification of maleic anhydride copolymers with an hydroxyfunctional acrylate, such as hydroxybutyl acrylate.

In another embodiment of the invention, the compound reacting with the polyamine comprising at least two primary or secondary amines and a quaternary ammonium group, can be copolymers of maleic anhydrides. Typical anhydride monomers are maleic anhydride, but also copolymers of other anhydride monomers can be used such as itaconic anhydride or crotonic anhydride.

In another embodiment of the invention, the compound reacting with the polyamine comprising at least two primary or secondary amines and a quaternary ammonium group, can be copolymers with monomers having an active methylene group, e.g. a β-keto-ester, a β-keto-amide, an anhydride or a 1,3-diketone, such as diacetone acrylamide or 2-(acetoacetoxy)ethyl methacrylate.

A.2. Preparation of the Resin Particle Dispersion

The resin particle dispersion used in the liquids according to the invention can be prepared using both chemical and physical methods. Suitable methodologies to form a polymeric shell surrounding a resin particle, include complex co-acervation, liposome formation, spray drying and polymerization methods.

In the present invention preferably a polymerization method is used, as it allows the highest control in designing the particles. More preferably interfacial polymerization is used to prepare the particles of the invention. This technique is well-known and has been reviewed by Zhang Y. and Rochefort D. (Journal of Microencapsulation, 29 (7), 636-649 (2012) and by Salitin (in Encapsulation Nanotechnologies, Vikas Mittal (ed.), chapter 5, 137-173 (Scrivener Publishing LLC (2013)).

In general, interfacial polymerization requires the emulsion of an oleophilic phase in an aqueous continuous phase or vice versa. The oleophilic phase is preferably obtained by using a substantially water immiscible organic solvent. Upon polymerisation, a resin or polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The resin particles according to the present invention are preferably prepared from an oleophilic emulsion in an aqueous continuous phase.

Preferably, the oleophilic phase comprises the compound containing at least two functional groups capable of reacting with the primary or secondary amines of the crosslinker. More preferably, these functional groups are an epoxide, an isocyanate, a β-keto-ester, a β-keto-amide, an anhydride, a 1,3-diketone, a chloroformate, a sulfochloride, an acid halide, an enol ester, an oxalate ester or an aziridine.

Different chemistries can be used as suitable polyisocyanates. The structure and reactivity of the polyisocyanate, its molecular weight and viscosity is important in the process of producing small droplets under high shear.

When emulsifying the water immiscible solvent in the aqueous phase, the breaking up of the droplets is dependent on the viscosity of the solvent and water phase. Highest shear forces can usually be applied when the viscosity of the water immiscible solvent and the water phase are close to each other. Therefore, also polyisocyanates having lower molecular weights give better results in reducing the droplet size by high shear. Smaller droplet size of the oleophilic phase (obtained by the water immiscible solvent, the second polymer and the polyisocyanate) lead to capsules having a smaller particle size.

The type of solvent forming the oleophilic phase in the interfacial polymerization, is important to obtain an industrial scalable process. Preferably an organic solvent is used with a low boiling point which can be easily removed, such as ethyl acetate or methylene chloride. Preferably the organic solvent has a boiling point lower than that of water.

In a preferred embodiment of the invention, a substantial water immiscible solvent is used in the emulsifying step, which is removed by solvent stripping before or after the polymeric shell formation.

In a particularly preferred embodiment, the water immiscible solvent has a boiling point below 100° C. at normal pressure. Esters and ketones are particularly preferred as water immiscible solvent. A preferred organic solvent is ethyl acetate, because it also has a low flammability hazard compared to other organic solvents.

A substantial water immiscible solvent is an organic solvent having low miscibility in water. Low miscibility is defined as any water solvent combination forming a two phase system at 20° C. when mixed in a one over one volume ratio.

The core of the resin particle of the invention may contain an oligomer or polymer which preferably does not react with the polyamine crosslinker comprising at least two primary or secondary amines and a quaternary ammonium group. This is usually incorporated into the particles by dissolving it in the organic solvent forming the oleophilic phase.

The method for preparing the dispersion of resin particles according to the invention, preferably includes the following steps:

a) preparing an aqueous solution of the polyamine crosslinker comprising at least two primary or secondary amines and a quaternary ammonium group; and
b) preparing a non-aqueous solution comprising a compound containing at least 2 functional groups capable of reacting with the primary or secondary amines of the polyamine crosslinker in a substantial water immiscible organic solvent and preferably having a lower boiling point than water. More preferably, these functional groups are an isocyanate, an epoxide, an aziridine, a silane, a β-keto-ester, a β-keto-amide, an anhydride or a 1,3-diketone;
c) emulsifying the non-aqueous solution (=oleophilic phase) under high shear in the aqueous solution (=aqueous phase);
d) optionally stripping the organic solvent from the mixture of the aqueous solution and the non-aqueous solution; and
e) optionally adding water that is removed during evaporation to obtain a desired resin particle concentration; and
f) formation of a shell by initiating the interfacial polymerization of the polyamine comprising at least two primary or secondary amines and a quaternary ammonium group with the compound containing at least 2 functional groups capable of reacting with the primary or secondary amines of the crosslinker e.g. by a temperature increase, the addition of a catalyst, or by UV-irradiation.

The initiation of the interfacial polymerization happens mostly spontaneously at room temperature, so no initiation is required.

The resin particle dispersion used in the liquids according to the invention can then be completed into an aqueous inkjet liquid such as a pre-treatment liquid, an ink or an overcoat varnish by addition of e.g. colorants, water, humectants, surfactants, solvents and the like.

Preferably the aqueous dispersion used in the liquids according to the invention is to be included in jettable formulations such as an inkjet ink, a jettable pre-treatment composition or a jettable overcoat varnish. The resin particles of the aqueous dispersion preferably have an average particle size of no more than 4 μm as determined by dynamic laser diffraction. The nozzle diameter of inkjet print heads is usually 20 to 35 μm. Reliable jetting is possible if the average particle size of the resin particles is five times smaller than the nozzle diameter. An average particle size of no more than 4 μm allows jetting by jetting heads having the smallest nozzle diameter of 20 μm. In a more preferred embodiment, the average particle size of the resin particles is ten times smaller than the nozzle diameter. Hence preferably, the average particle size is from 0.05 to 2 μm, more preferably from 0.05 to 1 μm. When the average particle size of the resin particle is smaller than 2 μm, excellent resolution and dispersion stability with time are obtained.

Organic solvents may be added for a variety of reasons. For example, it can be advantageous to add a small amount of an organic solvent to improve the dissolution of a compound in the liquid to be prepared, to obtain better penetration in porous substrates or to prevent fast drying of the liquid at the nozzle of the inkjet head. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), N-hydroxyethyl-pyrrolidon, N-butyl-pyrrolidon, amines (e.g., ethanolamine, and 2-(dimethylamino) ethanol), monohydric alcohols (e.g., methanol, ethanol, butanol, 1-propanol, 1-pentanol, 2-ethyl-hexanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides such as N,N-dimethylformamide, heterocycles such as 2-pyrrolidone and N-methyl-2-pyrrolidone, and acetonitrile.

B. Aqueous Pre-Treatment Composition

Aqueous pre-treatment compositions are preferably used in inkjet printing with aqueous based inks onto low-absorbing or non-absorbing substrates such as polymeric substrates, but also onto porous substrates.

The resin particles from the resin particle dispersion according to the invention are particularly suitable to be included in pre-treatment compositions. Due to the cationic charges in the shell of the resin particles, these can be combined with cationic fixing agents without negative effects onto the colloidal stability of the pre-treatment composition.

Without being bound by any theory, it is thought that the resin particles of the invention when including non-reactive polymers in the core in a pre-treatment composition provide an excellent ink spreading due to the hydrophilicity and swellability of the core of the resin particles which is surrounded by the crosslinked polymeric shell.

The aqueous pre-treatment composition according to the invention comprises the resin particles according to the invention and a fixing agent to crash, precipitate or destabilize the ink. The fixing agent is preferably a water soluble multivalent metal salt or a cationic polymer. The amount of resin particles according to the invention is from 1 wt. % to 45 wt. %, more preferably between 4 and 25 wt. % based on the total weight of the pre-treatment composition. It was observed that above 45 wt. %, jetting was not always reliable. If the amount of resin particles is below 1 wt. %, the improvement in ink spreading and water resistance of the images is hardly noticeable.

The polyvalent metal salt may be present in the pre-treatment composition to improve inkjet print quality. Generally, the polyvalent metal salt may be any water-soluble polyvalent metal salt. In specific examples, the polyvalent metal salt may include calcium chloride ($CaCl_2$)), magnesium chloride ($MgCl_2$), magnesium sulfate ($MgSO_4$), aluminium chloride ($AlCl_3$), calcium nitrate ($Ca(NO_3)_2$), magnesium nitrate ($Mg(NO_3)_2$), magnesium acetate (Mg $(CH_3COO)_2$), zinc acetate ($Zn(CH_3COO)_2$) calcium propionate ($Ca(C_2H_5COO)_2$), or a combination thereof. In further examples, the polyvalent metal salt may include a metal cation selected from calcium, copper, nickel, magnesium, zinc, barium, iron, aluminium, chromium, or another polyvalent metal.

The polyvalent metal salt may also include an anion. In some examples, the anion may be fluoride, chloride, iodide, bromide, nitrate, chlorate, sulfate, acetate, or $RCOO^-$ where R is hydrogen or any low molecular weight hydrocarbon chain, e.g., C1 to C12. In a more specific example, the anion may be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. The cationic salt may also be a mixture of two or more different cationic salts.

In some cases, the polyvalent metal salt may be present in an amount from 1 wt. % to 99 wt. % with respect to the entire weight of the pre-treatment composition. In more specific examples, the polyvalent metal salt may be present in an amount from 5 wt. % to 65 wt. %, more preferably from 20 wt. % to 60 wt. %, with respect to solids content of the pre-treatment composition. If the amounts are below the lower limits, insufficient fixing of the colorants occur resulting in a reduced image quality.

Polymeric cationic polymers, suitable as fixing agent in the pre-treatment composition contain either guanidinium or fully quaternized ammonium functionalities, such as quaternized polyamine copolymers. Generally, the weight average molecular weight (Mw) of the cationic polymer allows viscosity less than 25 cP at 25° C., as measured on a Brookfield viscometer. Typical Mw are less than 500.000, and in one aspect, less than 50.000.

Suitable classes of cationic polymers that can be used include, but are not limited to, quaternized polyamines, dicyandiamide polycations, diallyldimethyl ammonium chloride copolymers, quaternized dimethylaminoethyl (meth)acrylate polymers, quaternized vinylimidizol polymers, alkyl guanidine polymers, alkoxylated polyethylene imines, and mixtures thereof.

The pre-treatment composition may also contain pigments. Particularly useful for printing on dark or transparent substrates, is a pre-treatment liquid containing a white pigment. The preferred pigment for the aqueous pre-treatment liquid is titanium dioxide. Titanium dioxide ($TiO_2$) pigment useful in the present invention may be in the rutile or anastase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about I μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. A pre-treatment composition comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. Metal oxide coatings of alumina, aluminasilica, boria and zirconia result in a positive charged surface of the $TiO_2$ pigments and hence are particularly useful in combination with the cationic stabilised resin particles of the invention because no additional surface treatment of the pigment is required.

Commercial examples of such coated titanium dioxides include R700 (alumina-coated, available from E.I. DuPont deNemours, Wilmington Del.), RDI-S(alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

C. Overcoat Varnish Composition

An overcoat varnish is used in inkjet printing for increasing the durability of inkjet printed images. The varnish composition according to the invention comprises water, the resin particles of the invention and preferably a co-solvent. The varnish composition can also obtain wax particles, surfactants, biocides, surface active agents to influence the friction coefficient, . . . . The overcoat varnish is applied onto at least the printed images and is applied via a coating technique or a jetting techniques.

The amount of resin particles according to the invention in the overcoat varnish is from 1 wt. % to 45 wt. %, more preferably from 4 to 25 wt. % based on the total weight of the varnish composition. It was observed that above 45 wt. %, jetting was not always reliable. If the amount of resin particles is below 1 wt. %, the improvement in durability of the images is hardly noticeable.

D. Inkjet Ink

Another liquid for inkjet printing using the resin particles according to the invention is an aqueous ink jet ink containing a colorant. The resin particles are preferably present in the inkjet ink in an amount of no more than 30 wt. %, preferably between 4 and 25 wt. % based on the total weight of the ink. Any colorant may be suitable, but organic or inorganic pigments having a positively charged surface are particularly suitable. Examples of such inorganic pigments are white pigments based on $TiO_2$ as described in § B. Other suitable inorganic pigments are iron-oxide or chrome-oxide based pigments.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Particularly suitable pigments are preferably dispersed in the aqueous medium using a cationic polymeric dispersant or a cationic surfactant. The resin particles according to the invention are particularly suitable with these dispersed pigments as no interaction can occur with the chemically attached cationic groups in the shell of the resin particle and the cationic polymeric dispersant or cationic surfactant of the pigment.

In a preferred embodiment, the colorants, such as dyes or pigments and more preferably white pigments can be present in the core of the particles according to the invention.

The aqueous inkjet ink may further comprise a surfactant, a humectant, a biocide and a thickener as an additive.

E. Inkjet Recording Method

The liquids for inkjet printing comprising the resin particles according to the invention may be a pre-treatment composition, an inkjet ink or in an overcoat varnish.

The inkjet recording method according to the invention is suitable for making images on following substrates.

The substrate in the inkjet recording method may be porous, such as e.g. textile, paper and leather, but may also be low-absorbing such as card board substrates or non-absorbing such as polyethylene, polypropylene, polycarbonate, polyvinyl chloride, polyesters like polyethylene terephthalate (PET), polyethylene naphthalate (PEN), polylactide (PLA), polymethylmethacrylate or polyimide.

The substrate may also be a paper substrate, such as plain paper or resin coated paper, e.g. polyethylene, polypropylene, acrylic butadiene styrene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyester sheet having a density of 1.10 g/cm$^3$ or more.

E.1. Application Method of the Pre-Treatment Composition

The pre-treatment composition according to the present invention is suitable for treating different substrates, porous and non-porous ones. The treatment by the pre-treatment composition containing the resin particles according to the invention, provides a fixing of the colorants of an ink which is jetted onto the applied pre-treatment composition to form the printed image. The fixing strongly limits the colour bleeding, increases the sharpness of the image and increases the water and solvent resistance of the printed images. The pre-treatment composition containing the resin particles according to the invention provides a good spreading of the inkjet ink which is jetted onto the applied pre-treatment composition.

Porous substrates include paper, card board, white lined chipboard, corrugated board, packaging board, folding board, wood, ceramics, stone, leather and textile. Non-porous substrates include metal, glass, polypropylene, polyvinylchloride, PET, PMMA, polycarbonate, polyamide, polystyrene or co-polymers thereof. The papers can be a single layer of a multilayer paper.

The paper may be brown Kraft, White Top or bleached board. The paper may be manufactured from chemical, wood, or recycled fibre. As an example, the paper may be a liner intended for printing on page wide web presses and converted into corrugated boxes. In this aspect, the liner paper may be used as a double face liner and may be converted directly in a corrugator or laminated onto a double face liner after corrugation. The paper may also be boards used for boxes and other packaging applications.

The pre-treatment composition is particularly suited for being jetted onto substrates, such as the one intended for packaging applications.

One of the reasons is that the resin particles according to the invention do not show film formation in inkjet head nozzles and supply equipment. A high jetting reliability is hence achieved.

All well-known conventional methods can be used for coating or impregnating the substrate by the pre-treatment composition. Examples of the method include air knife coating, blade coating, roll coating, flexographic coating, gravure coating and spraying. More preferably the pre-treatment composition is applied by means of a jetting technique, such as an inkjet technique. The pre-treatment composition is then preferably applied using an ink jet head or valve jet head.

This means of applying the pre-treatment composition, which is preferably according to an image, has the advantage that the amount of required pre-treatment composition is substantially lower than with coating methods. This reduces material cost and decreases the required time for drying the applied amount of pre-treatment composition.

Suitable ink jet head types for applying the pre-treatment composition are piezoelectric type, continuous type, thermal print head type, Memjet-type or valve jet type.

After applying the pre-treatment composition onto a substrate, the composition is preferably at least partially dried before printing the image onto the treated substrate.

Substrates to which the pre-treatment composition has been applied may be (partially) dried and optionally undergo a heat treatment, before the subsequent ink jetting step with the colorant containing ink. The drying step can be performed at the air, but the heating step must be performed by using heat sources; examples include equipment for forced-air heating, radiation heating such as IR-radiation, including NIR-, CIR- and SWIR radiation, conduction heating, high-frequency drying, and microwave drying. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the pre-treatment composition, is not substantially dried before the image is printed by means of the jetting of the aqueous ink jetting step.

E.2. Ink Jetting & Drying

After the application of the pre-treatment composition to the substrate, an aqueous inkjet ink comprising a colorant is applied to the substrate, preferably onto the parts where the pre-treatment composition has been applied on. The colorant is preferably a pigment. A preferred method of applying the aqueous inkjet ink is by means of an ink jetting technique.

A preferred ink jet head for the jetting of the pre-treatment composition and inkjet ink is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with pre-treatment composition. When the voltage is again removed, the ceramic expands to its original shape, ejecting a drop of ink from the ink jet head.

The jetting of the aqueous inkjet ink is not restricted to piezoelectric inkjet printing. Other inkjet print heads can be used and include various types, such as a continuous type, a thermal print head type, a Memjet-type of head and a valve jet type.

Examples of the heating process to dry the inkjet ink according to the invention are listed in § E.1. The drying step is such that a temperature of the printed images is preferably obtained below 150° C.

E.3 Application Method of the Overcoat Varnish

In another preferred inkjet recording method, the method comprises the steps of: a) jetting an aqueous inkjet ink onto a substrate, the ink comprising a colorant, preferably a pigment; and b) optionally drying the jetted inkjet ink; and c) applying an overcoat varnish comprising water and the resin particles according to the invention; and d) drying the applied overcoat varnish. If step b) was not performed, the drying in step d) should be performed by applying heat such that the temperature of the applied ink is of at least 50° C., more preferably at least 80° C.

In a more preferred inkjet recording method, a pre-treatment composition may be applied before step a). More preferably, the pre-treatment composition comprises the resin particles according to the invention. The pre-treatment liquid is preferably jetted by means of an inkjet head.

In another preferred inkjet recording method, the overcoat varnish is applied via a technique selected from the group of ink jetting, valve jetting and spraying. More specifically, these techniques of ink jetting and valve jetting allow, the overcoat varnish according to the invention to be applied image wise. This has the advantage that the amount of applied liquid required is substantially lower than with the other application methods. This reduces material cost and decreases the required time for drying the applied amount of overcoat varnish. Another advantage is that differences in appearances of the image (e.g. gloss) can be obtained.

The jetting and drying of the overcoat varnish can be performed as described in § E.1.

F. Examples

F.1. Materials

All materials used in the following examples were readily available from standard sources such as Aldrich Chemical Co. (Belgium) and Acros (Belgium) unless otherwise specified. Where used, water is demineralised water.

- PB15:3 is Hostaperm™ B4G-KR, a C.I. Pigment Blue 15:3 pigment from CLARIANT.
- Edaplan is an abbreviation used for Edaplan™ 482, a polymeric dispersant from MUNZING CHEMIE GmbH.
- Proxel is a 5 wt. % aqueous solution of 1,2-benzisothiazolin-3-one available as Proxel™ K from YDS CHEMICALS NV.
- Liquilube 404E is a 35 wt. % aqueous HDPE wax dispersion from Lubrizol
- Surfynol 104PG50 is a 50 wt. % solution of 2,4,7,9-Tetramethyl-5-decyne-4,7-diol in propylene glycol from Evonik
- Aquacer 530 is an aqueous dispersion containing 32 wt. % oxidized HDPE wax from BYK
- Synperonic PE P105 is a PEO/PPO co-polymeric dispersant having an average Mw of 6500 g/mol and a PPO/PEO weight ratio of approximately 1.00 from Croda
- Kauropal K933 is a non-ionic oxirane, mono(2-propylheptyl) ether from BASF
- Tego Foamex 822 is a polyether siloxan copolymer from Evonik
- Desmodur N75 BA is a HDI biuret based polyisocyanate 75% dissolved in butylacetate from Covestro
- Desmodur N3200 is an HDI based polyisocyanurate supplied by Covestro
- Dynacol 7150 is a polyester polyol supplied by Evonik
- Ymer N120 is a α-[2,2-bis(hydroxymethyl)butyl]-w-methoxy-poly(oxy-1,2-ethanediyl). And is supplied by Perstorp.
- Reaxis C708 is a catalyst supplied by Reaxis BV, The Netherlands
- Vestanat IPDI is isophorone diisocyanate and is supplied by Evonik
- GMAC is Glycidyltrimethylammonium chloride supplied by Sachem
- PA-1 is Triethylenetetramine (TETA) and supplied by Aldrich
- OE-1 is an oxalate ester which is prepared as follows: 4 g. of dibutyl oxalate was weighed in a 3 necked round bottom flask of 50 ml and dissolved by addition of 10 g. of dichloromethane. 0.964 g. of tris(2-aminoethyl) amine was added to the solution. The reaction gave some heat, which resulted in a temperature rise until 36° C. The flask was stirred for 1 hour at room temperature
- CATSURF-1 is a cationic surfactant which is prepared as follows: g. of (Acrylamidopropyl)trimethylammonium chloride (75 wt. % in water supplied by TCI) was weighed in a 3 necked round bottom flask of 100 ml. The cationic acrylamine is dissolved by addition of 26 g. of isopropanol. 7.946 g. of Dodecyl amine was added. 5.2 g. of triethylamine is added and the reaction mixture was heated for 24 hours at reflux. Subsequently the isopropanol and water was evaporated using a rotary evaporator, yielding the cationic surfactant.
- GMAC-TETA is an aqueous solution of a GMAC:TETA 1:1 adduct polyamine crosslinker and is prepared as follows: 7.14 g. of a 70 wt. % aqueous GMAC solution was weight in a 50 ml bottle. 4.83 g. of PA-1 was added slowly under stirring with a magnetic stirrer.
- PU-1 is a 43.00 wt. % polyurethane solution in ethyl acetate and is prepared as follows: 227.49 g. of Dynacol 7150 is dissolved in 402.83 g. of ethyl acetate at 45° C. in an Erlenmeyer. 56.87 g. of Ymer N120 is added to the Dynacol solution. Whereas Ymer N90 is a wax, it is preheated at 90° C. in order to become liquid and more easy to handle. The mixture of Ymer N120 and Dynacol 7150 is mixed and a clear solution in ethyl acetate is obtained. The solution is allowed to cool to room temperature. A catalyst solution is prepared by dilution of 2.14 g. of Reaxis C708 with 19.34 g. of ethyl acetate. The polyol solution is transferred to a 1000 mL three-necked round-bottom flask equipped with a coiled condenser and an overhead stirrer. The flask is flushed with nitrogen and slow nitrogen flow is maintained during stirring and reaction. Subsequently the catalyst was added dropwise via an addition funnel with pressure equalization arm. The oil bath was heated to 75° C. After 1 hour, the reaction mixture reaches a constant temperature of about 68° C. Subsequently 31.32 g. of Vestanat IPDI is added via an addition funnel with pressure equalization arm in 35 minutes. Then the oil bath is put to 70° C. and the reaction is allowed to react during 19 hours. After reacting, the oil bath is put to 75° C. for 30 minutes and cooled to room temperature. The solids content is 43.0 wt. %.

F.2. Preparation of Resin Particle Dispersions

F.2.1. Preparation of Comparative Resin Particle Dispersion COMP-PD1

A cationic microcapsule was prepared according to the method used for preparing CATCAPS-2 described in the published patent application WO18138069A. CATCAPS-2 is a microcapsule dispersion, prepared by using a HDI biuret based polyisocyanate and a blocked isocyanate in the oleophilic phase and a cationic surfactant in the aqueous phase.

The solid content of COMP-PD1 is 26.83 wt. %.

F.2.2. Preparation of Comparative Resin Particle Dispersion COMP-PD2

In a round bottom flask of 50 ml, 10 g. of Desmodur N75 BA was added to the OE-1. In glass beaker of 100 ml, 33 g. of demi-water and 1.98 g. of CATSURF-1 was added. After the surfactant was dissolved, the polyisocyanate and oxalate ester were added to the cationic surfactant solution. Subsequently the mixture was treated with an Ultraturrax high shear mixing device for 5 minutes at 15000 RPM. The dichlormethane and butylacetate was removed using a rotary evaporator at 40° C. and a pressure of 100-150 mbar. After removing the solvent, the weight of the flask was measured and the amount of water which was evaporated was compensated to a total weight of 50 g. Afterwards the flask is heated overnight at 60° C., while being stirred using a magnetic stirrer, yielding the cationic microcapsule dispersion in water. The solids content of the capsule dispersion prepared is 25.56 wt. %.

F.2.3. Preparation of Inventive Resin Particle Dispersion INV-PD1

The INV-PD1 dispersion was prepared via interfacial polymerization wherein the oleophilic phase comprises a polyisocyanate and the aqueous phase comprises a 1:1 GMAC-TETA adduct. The PU/polyisocyanate weight ratio in this capsule is 50/50.

The oleophilic phase is prepared by mixing: 55.22 g. of ethyl acetate, 16.50 g. of Desmodur N3200 and 38.371 g. of PU-1. An aqueous phase is prepared by mixing: 1.8 g. of GMAC-TETA, 19.6 g. of a 25 wt. % aqueous solution of cetyl trimethyl ammonium chloride and 73.67 g. of water. The ethyl acetate solution (=oleophilic phase) is brought in a plastic bottle of 250 ml, having a wide opening and is placed in an ice bath in order to cool the solution. The aqueous solution (=aqueous phase) is added to the oleophilic phase which is emulsified in the aqueous phase by means of an Utraturrax device at 18000 RPM during 5 minutes. The emulsion is brought in a round bottom flask. In order to transfer everything, the plastic bottle is rinsed using 35.00 g. of water. The ethyl acetate of the emulsion is evaporated on a rotary evaporator until a weight of 145 g. The temperature was set 40° C. and the ethyl acetate was removed under reduced pressure. Evaporation was started at a pressure of 300 mbar and was decreased gradually till 50 mbar. The round bottom flask is placed in an oil bath at 40° C. and is heated to 60° C. The obtained resin particle dispersion is kept at 60° C. during 16 hours and then cooled to room temperature.

The resulting dispersion has a solids content of 27.11 wt. %, the Z-average particle size is 242.3 nm (determined by a Malvern particle sizer) and the pH of the microcapsule dispersion is 6.73.

F.3. Evaluation Methods

F.3.1. Image Quality

Comparative and inventive pre-treatment compositions, were applied onto a coated corrugated liner XLHD MM X-Liner HD (180 g/m$^2$) from MM Karton using a 4 μm spiral bar. The coated liner was dried at 60° C. in an oven for 2 minutes.

After drying the pre-treatment compositions, the coated liner was printed by means of an ImageXpert JetXpert with GIS print head driving electronics for FujiFilm Dimatix Samba print head (Samba G3L). The printing uses an aqueous cyan ink with a drop volume between 5.4-6.5 pl at a voltage between 19.5-23.5 V at 32° C. and a firing frequency of 7.8 kHz. The printed images were dried at 60° C. for 2 minutes in an oven. The pattern of the print is shown in FIG. 1.

The image quality of the print was evaluated by visually analysing the following three properties: 1) ink spreading; 2) ink fixing and 3) image sharpness.

Ink spreading: the ink should completely cover the solids in the printed image. A lack of ink spreading is demonstrated by the appearance of white lines in the solid areas. The evaluation was conducted by visually observing the solid areas and by giving a score from 0 (=excellent ink spreading, complete coverage) to 3 (=poor ink spreading, more than 20 white lines visible in the solid area).

Ink fixing: the ink should homogenously and intensely cover the solids in the printed image. A lack of ink fixing is demonstrated by the appearance of uneven patterns in the solid areas. The ink fixing was evaluated by visually observing the solid areas and by giving a score from 0 (=excellent ink fixing, homogeneous coverage) to 3 (=poor ink fixing, strong unevenness observable).

Image sharpness: the fine text should be readable. A lack of image sharpness is demonstrated by the disappearance of negative text. The image sharpness was evaluated by visually observing the negative texts and by giving a score from 0 (=excellent image sharpness, 6 pt clearly readable) to 3 (=poor image sharpness, 16 pt partially or totally covered by ink).

F.3.2. Water Resistance

The water resistance of the prints was evaluated by measuring the CIELAB ΔE after the water resistance tests.

The water resistance was evaluated by rubbing the solid areas with a wetted cotton swab, 10 double strokes. The ΔE of the image was calculated by comparing the CIELAB E values of the solid areas of the printed image before and after the wet rub.

The evaluation of the water resistance is according to the criteria as shown in Table 4. A good pre-treatment composition should provide acceptable levels of water resistance.

TABLE 4

Scoring figures of water resistance measurement

| Scoring | Water resistance |
|---|---|
| 0 (Excellent) | ΔE < 10 |
| 1 (Good) | 10 ≤ ΔE < 20 |
| 2 (Moderate) | 20 ≤ ΔE < 40 |
| 3 (Poor) | ΔE >= 40 |

F.4. Preparation of Pre-Treatment Compositions

The pre-treatment compositions were prepared by mixing the ingredients given in Table 5. The weight percentages are relative to the total weight of the pre-treatment compositions. The raw materials were used as supplied without any further treatments. White opaque liquids were obtained.

TABLE 5

| Pre-treatment compositions | | | |
|---|---|---|---|
| | Amount in wt. % | | |
| Compound | COMP-PC1 | COMP-PC2 | INV-PC1 |
| COMP-DP1 | 19.86 | — | — |
| COMP-DP2 | — | 20.85 | — |
| INV-DP1 | — | — | 19.66 |
| $Mg(NO_3)_2$•$6H_2O$ | 10.0 | 10.0 | 10.0 |
| Kauropal K933 | 0.04 | 0.04 | 0.04 |
| Tego Foamex 822 | 0.04 | 0.04 | 0.04 |
| Aquacer 530 | 8.0 | 8.0 | 8.0 |
| Synperonic PE P105 | 1.0 | 1.0 | 1.0 |
| Propylene glycol | 18.0 | 18.0 | 18.0 |
| 1,2-hexanediol | 2.85 | 2.85 | 2.85 |
| D.I. water | To complete to 100% | To complete to 100% | To complete to 100% |

F.5. Preparation of Aqueous Inkjet Ink

In a first step, a concentrated aqueous pigment dispersion was made by mixing the pigment PB15: 3, with the dispersant Edaplan using a Disperlux™ Yellow mixer and milled using a Dynomill™ KDL with 0.04 mm yttrium stabilized zirconium beads YTZ™ Grinding Media (available from TOSOH Corp.). After milling, the dispersion is separated from the beads. The concentrated aqueous pigment dispersion served as the basis for the preparation of the inkjet inks.

An aqueous cyan ink was prepared by diluting the concentrated pigment dispersion with the other ink ingredients according to Table 6 expressed in wt. % based on the total weight of the ink. Water was added to complete the ink to the desired pigment concentration.

TABLE 6

| Aqueous inkjet ink composition | |
|---|---|
| Component | Amount (wt. %) |
| PB15:3 | 3.0 |
| Edaplan | 1.5 |
| Proxel | 0.2 |
| 1,2-hexanediol | 3.00 |
| Surfynol 104PG50 | 0.4 |
| Propylene glycol | 36.00 |
| Liquilube 404 E | 2.86 |
| Water | 53.04 |

F.6. Image Quality and Water Resistance of Printed Images

The performance of different pre-treatment compositions with respect to the image quality and water resistance of printed images is listed in Table 7.

TABLE 7

| Image quality and water resistance of printed images onto comparative and inventive pre-treatment compositions. | | | | |
|---|---|---|---|---|
| | Pre-treat comp. | | | |
| | No pre-treatment | COMP-PC1 | COMP-PC2 | INV-PC1 |
| Ink spreading | 1 | 3 | 3 | 0 |
| Ink fixing | 3 | 0 | 1 | 0 |
| Image sharpness | 0 | 0 | 0 | 0 |
| Water resistance | 0 | 1 | 0 | 1 |

It can be seen from Table 7, that the pre-coat composition containing the resin particle dispersion obtained by reacting a polyisocyanate with a polyamine crosslinker comprising at least two primary or secondary amines and a quaternary ammonium group, does improve image quality significantly in terms of ink spreading. The physical properties such as water resistance of the print with the inventive resin particle dispersion, showed no negative effects with respect to the comparative.

The invention claimed is:

1. A pre-treatment composition for inkjet printing, comprising water, resin particles, and a water-soluble fixing agent, the resin particles are obtained by reaction between a polyamine crosslinker comprising at least two primary or secondary amines and a quaternary ammonium group and a compound comprising two functional groups capable of reacting with the primary or secondary amines of the crosslinker.

2. The pre-treatment composition of claim 1, wherein the functional groups are selected from the group consisting of an epoxide, an isocyanate, a β-keto-ester, a β-keto-amide, an anhydride, a 1,3-diketone, a chloroformate, a sulfochloride, an acid halide, an enol ester, an oxalate ester, and an aziridine.

3. The pre-treatment composition of claim 1, wherein the polyamine crosslinker is of General Formula I or II General Formula I

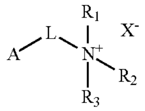

General Formula II

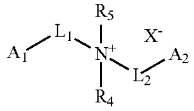

wherein $R_1$, $R_2$, $R_3$, $R_4$, and $R_5$ are each independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

L, $L_1$, and $L_2$ each independently represent a divalent linking group having no more than 15 carbon atoms;

A represents a structural moiety comprising at least two functional groups selected from the group consisting of a primary and a secondary amine;

$A_1$ and $A_2$ each independently represent a structural moiety comprising at least one functional group selected from the group consisting of a primary and a secondary amine; and $X^-$ is a counter ion to compensate the positive charge of the quaternary ammonium group.

4. The pre-treatment composition of claim 2, wherein the polyamine crosslinker is of General Formula I or II General Formula I

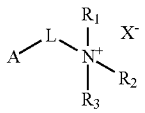

-continued

General Formula II

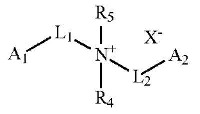

wherein $R_1$, $R_2$, $R_3$, $R_4$, and $R_5$ are each independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

L, $L_1$, and $L_2$ each independently represent a divalent linking group having no more than 15 carbon atoms;

A represents a structural moiety comprising at least two functional groups selected from the group consisting of a primary and a secondary amine;

$A_1$ and $A_2$ each independently represent a structural moiety comprising at least one functional group selected from the group consisting of a primary and a secondary amine; and $X^-$ is a counter ion to compensate the positive charge of the quaternary ammonium group.

5. The pre-treatment composition of claim 1, wherein the reaction takes place at an interface formed by an oleophilic phase in an aqueous continuous phase, and wherein the oleophilic phase comprises the compound and the aqueous phase comprises the polyamine crosslinker.

6. The pre-treatment composition of claim 2, wherein the reaction takes place at an interface formed by an oleophilic phase in an aqueous continuous phase, and wherein the oleophilic phase comprises the compound and the aqueous phase comprises the polyamine crosslinker.

7. The pre-treatment composition of claim 4, wherein the reaction takes place at an interface formed by an oleophilic phase in an aqueous continuous phase, and wherein the oleophilic phase comprises the compound and the aqueous phase comprises the polyamine crosslinker.

8. The pre-treatment composition of claim 5, wherein the oleophilic phase comprises an oligomer or polymer selected from the group consisting of poly(urethanes) and copolymers thereof, acrylics and copolymers thereof, poly(esters), poly(styrenes) and copolymers thereof, poly(vinyl amides) and copolymers thereof, poly(vinyl alcohol) derivatives and copolymers thereof, poly(acetals) and copolymers thereof, poly(ethers) and copolymers thereof, poly(vinyl ethers) and copolymers thereof, polyvinyl(esters) and copolymers thereof, poly(imides) and copolymers thereof, poly(imines) and copolymers thereof, polycarbonates and copolymers thereof, poly(vinyl chloride) and copolymers thereof, poly (vinylidene chloride) and copolymers thereof, poly(amic acids) and copolymers thereof, and poly(saccharides) and derivatives thereof.

9. The pre-treatment composition of claim 6, wherein the oleophilic phase comprises an oligomer or polymer selected from the group consisting of poly(urethanes) and copolymers thereof, acrylics and copolymers thereof, poly(esters), poly(styrenes) and copolymers thereof, poly(vinyl amides) and copolymers thereof, poly(vinyl alcohol) derivatives and copolymers thereof, poly(acetals) and copolymers thereof, poly(ethers) and copolymers thereof, poly(vinyl ethers) and copolymers thereof, polyvinyl(esters) and copolymers thereof, poly(imides) and copolymers thereof, poly(imines) and copolymers thereof, polycarbonates and copolymers thereof, poly(vinyl chloride) and copolymers thereof, poly (vinylidene chloride) and copolymers thereof, poly(amic acids) and copolymers thereof, and poly(saccharides) and derivatives thereof.

10. The pre-treatment composition of claim 7, wherein the oleophilic phase comprises an oligomer or polymer selected from the group consisting of poly(urethanes) and copolymers thereof, acrylics and copolymers thereof, poly(esters), poly(styrenes) and copolymers thereof, poly(vinyl amides) and copolymers thereof, poly(vinyl alcohol) derivatives and copolymers thereof, poly(acetals) and copolymers thereof, poly(ethers) and copolymers thereof, poly(vinyl ethers) and copolymers thereof, polyvinyl(esters) and copolymers thereof, poly(imides) and copolymers thereof, poly(imines) and copolymers thereof, polycarbonates and copolymers thereof, poly(vinyl chloride) and copolymers thereof, poly (vinylidene chloride) and copolymers thereof, poly(amic acids) and copolymers thereof, and poly(saccharides) and derivatives thereof.

11. The pre-treatment composition of claim 1, wherein the compound is a polyisocyanate and the polyamine crosslinker is a reaction product of a polyamine and a glycidyltrialkylammonium salt.

12. The pre-treatment composition of claim 2, wherein the compound is a polyisocyanate and the polyamine crosslinker is a reaction product of a polyamine and a glycidyltrialkylammonium salt.

13. The pre-treatment composition of claim 1, wherein the amount of resin particles is from 1 wt. % to 45 wt. % with respect to the total weight of the pre-treatment composition and the water-soluble fixing agent is a multivalent metal salt.

14. An overcoat varnish for inkjet printing, comprising water and resin particles, the resin particles are obtained by reaction between a polyamine crosslinker comprising at least two primary or secondary amines and a quaternary ammonium group and a compound comprising two functional groups capable of reacting with the primary or secondary amines of the crosslinker.

15. An ink set comprising a pre-treatment composition as defined in claim 1 and an aqueous inkjet ink comprising a colorant.

16. An ink set comprising an overcoat varnish as defined in claim 14 and an aqueous inkjet ink comprising a colorant.

17. An inkjet printing method comprising the steps of:

a) applying a pre-treatment composition as defined in claim 14 onto a substrate;

b) optionally at least partially drying the applied pre-treatment composition;

c) jetting onto the applied pre-treatment composition an aqueous inkjet ink containing a colorant; and d) applying heat to dry the jetted aqueous inkjet ink.

18. An inkjet recording method comprising the following steps:

i) jetting onto a substrate an aqueous inkjet ink containing a colorant to obtain an image; and ii) applying an overcoat varnish as defined in claim 14 onto the obtained image of step i).

19. A method for preparing an aqueous dispersion of resin particles comprising the following steps:

a) preparing an aqueous solution of a polyamine crosslinker comprising at least two primary or secondary amines and a quaternary ammonium group;

b) preparing a non-aqueous solution of a compound containing at least 2 functional groups capable of reacting with the primary or secondary amines of the polyamine crosslinker in a substantial water immiscible organic solvent;

c) emulsifying the non-aqueous solution under high shear in the aqueous solution;

d) optionally stripping the organic solvent from the mixture of the aqueous solution and the non-aqueous solution; and e) formation of a shell by initiating the interfacial polymerization of the polyamine comprising at least two primary or secondary amines and a quaternary ammonium group with the compound containing at least 2 functional groups capable of reacting with the primary or secondary amines of the crosslinker.

* * * * *